United States Patent
Lindsay et al.

[19]

[11] Patent Number: 6,121,611
[45] Date of Patent: Sep. 19, 2000

[54] FORCE SENSING PROBE FOR SCANNING PROBE MICROSCOPY

[75] Inventors: Stuart M. Lindsay, Phoenix; Tianwei Jing, Tempe, both of Ariz.

[73] Assignees: Molecular Imaging Corporation, Phoenix; Arizona Board of Regents, Tempe, both of Ariz.

[21] Appl. No.: 09/082,095

[22] Filed: May 20, 1998

[51] Int. Cl.[7] .................................................. G01B 5/28
[52] U.S. Cl. ........................... 250/306; 250/307; 73/105
[58] Field of Search ................................. 250/306, 307; 73/105; 324/252

[56] References Cited

U.S. PATENT DOCUMENTS

| | | |
|---|---|---|
| 4,644,310 | 2/1987 | Anderson, III et al. . |
| 5,103,174 | 4/1992 | Wandass et al. ................... 250/306 |
| 5,315,247 | 5/1994 | Kaiser et al. . |
| 5,412,980 | 5/1995 | Elings et al. . |
| 5,513,518 | 5/1996 | Lindsay . |
| 5,515,719 | 5/1996 | Lindsay . |
| 5,519,212 | 5/1996 | Elings et al. . |
| 5,612,491 | 3/1997 | Lindsay . |
| 5,670,712 | 9/1997 | Cleveland et al. . |
| 5,856,617 | 1/1999 | Gurney et al. ........................ 73/105 |
| 5,866,805 | 2/1999 | Han et al. . |

OTHER PUBLICATIONS

Hansma et al., "Tapping Mode Atomic Force Microscopy in Liquids," *Appl. Phys. Lett.*, 64:1738–1740 (1994).

Putnam et al., "Tapping Mode Atomic Force Microscopy in Liquid," *Appl. Phys. Lett.*, 64:2454–2456 (1994).

Lindsay et al.., "Scanning Tunneling Microscopy and Atomic Force Microscopy Studies of Biomaterials at at a Liquid–Solid Interface," *J. Vac. Sci. Technol.* 11:808–815 (1993).

O'Shea et al., "Atomic Force Microscopy of Local Compliance at Solid–Liquid Interfaces," *Chem. Phys. Lett.* 223:336–340 (1994).

Han et al., "A Magnetically Driven Oscillating Probe Microscope for Operation in Liquids," *Appl. Phys. Lett.* 69, 4111–4113 (1996).

Tam et al., "High–Precision Optical Technique to Measure Magnetostriction of a Thin Magnetic Film Deposited on a Substrate," *HEEE Transactions on Magnetics* 25, 2629–2638 (1989).

Bryant et al., "Scanning Tunnelling and Atomic Force Microscopy Performed with the Same Probe in One Unit", *J. of Microscopy*, vol. 152, Pt. 3, Dec. 1988, pp. 871–875.

Guckenberger et al., "Scanning Tunneling Microscopy of Insulators and Biological Specimens Based on Lateral Conductivity of Ultrathin Water Films", *Science*, vol. 266, Dec. 1994, pp. 1538–1540.

*Primary Examiner*—Kiet T. Nguyen
*Attorney, Agent, or Firm*—Killworth, Gottman, Hagan & Schaeff, LLP

[57] ABSTRACT

Force sensing probes for use in scanning probe microscopes and a method for coating such probes with a film comprising a magnetostrictive material are provided. The probes may be magnetized by placing them in a magnetic field which can be oriented in any direction with respect to the probes. The magnetostrictive effect leads to a compression or expansion of the magnetic film, altering its length by the strength of the applied field. This in turn causes the probe, which in a preferred embodiment is in the form of a cantilever, and the applied magnetic film, to deflect or bend. The consequent motion of the probe is much greater than that obtained by direct application of a magnetic force and the effect is not sensitive to the direction of the applied field.

26 Claims, 8 Drawing Sheets

FORCE SENSING PROBE FOR SCANNING PROBE MICROSCOPY

This invention was made with Government support under contract No. BIR9513233 awarded by the National Science Foundation. The Government has certain rights in the invention.

BACKGROUND OF THE INVENTION

The present invention relates to scanning probe microscopy, and in particular to the construction of a microscope and force-sensing probes in the form of cantilevers for use in atomic force microscopy.

In the conventional atomic force microscope (AFM), the deflection of a flexible cantilever is used to monitor the interaction between a probe-tip and a surface under study. As the tip is brought close to the surface, it deflects in response to interactions with the surface under study. These deflections are used to control the distance of the tip from the surface and to measure details of the surface. It is often desirable to operate an atomic force microscope in an oscillating mode. In this mode (known as AC mode), the cantilever is vibrated at a high frequency, and the change in amplitude (or phase) of the cantilever as it approaches a surface is used to control the microscope.

One reason for doing this is because, when oscillated at high amplitude, the probe is less likely to stick to the surface under study. However, this AC mode of operation is also intrinsically more sensitive. AC detection shifts the signal to be detected to sidebands on a carrier signal, avoiding the low frequency noise that DC signals suffer from. In addition, the mechanical Q of a cantilever resonance can be used to enhance the overall signal to noise ratio of a microscope operated this way.

In one version of the AC AFM as taught by Elings et al, U.S. Pat. Nos. 5,412,980 and 5,519,212, the oscillation is used mainly as a means of avoiding the effects of adhesion between the tip and surface. However, such adhesion is easily avoided by chemical means. For example, the microscope may be operated in a fluid which minimizes adhesion. Alternatively (or additionally), a tip material can be chosen so as to minimize its adhesion to the surface under study. In that case, there is no reason to operate the microscope at a large amplitude of oscillation.

The usual method of exciting motion in the AFM cantilever is to drive it with an acoustic excitation. This method works well in air or gas and has been made to work with the tip submerged in water as taught by Hansma et al, "Tapping Mode Atomic Force Microscopy in Liquids," *Appl. Phys. Lett.* 64: 1738–1740 (1994) and Putman et al, "Tapping Mode Atomic Force Microscopy in Liquid," *Appl. Phys. Lett.* 64: 2454–2456 (1994). However, in a fluid, the motions of the cantilever become viscously damped, so that substantial acoustic amplitude is required to drive motion of the cantilever. Furthermore, the fluid acts as a coupling medium between the source of acoustic excitation and parts of the microscope other than the cantilever. The result is that parts of the microscope other than the cantilever get excited by the acoustic signal used to vibrate the cantilever. If these motions lead to a signal in the detector, a background signal is generated which is spurious and not sensitive to the interaction between the tip and surface.

A scheme for exciting the cantilever directly has been described by Lindsay et al, "Scanning Tunneling Microscopy and Atomic Force Microscopy Studies of Biomaterials at a Liquid-Solid Interface," *J. Vac. Sci. Technol.* 11: 808–815 (1993). In this approach, a magnetic particle or film is attached to the cantilever and a solenoid near the cantilever is used to generate a magnetic force on the cantilever. This arrangement gives extreme sensitivity to surface forces, presumably because of a lack of background spurious signal as would occur in an acoustically-excited microscope. Lindsay, U.S. Pat. Nos. 5,515,719 and 5,513,518, the disclosures of which are hereby incorporated by reference, teach this novel form of AC-AFM in which the cantilever is excited by magnetic means.

Magnetic cantilevers are required in order to operate such a microscope. In the prior art at least three approaches were used. Lindsay et al, *J. Vac. Sci. Technol.* 11: 808–815 (1993), described a method for fixing a magnetic particle onto the cantilever. However, this method is not suitable for the fabrication of suitable cantilevers in quantity. O'Shea et al, "Atomic Force Microscopy of Local Compliance at Solid-Liquid Interfaces," *Chem. Phys. Lett.* 223: 336–340 (1994), describe a method for evaporating a magnetic coating onto the cantilevers. In order to avoid bending the cantilevers owing to the interfacial stress introduced by the evaporated film, they place a mask over most of the cantilever so that the magnetic film is deposited only onto the tip of the force-sensing cantilever. This approach requires precision alignment of a mechanical mask and it is not conducive to simple fabrication of suitable coated cantilevers. Other methods for the formation of magnetic films on cantilevers and for calibrating the properties of the films have been described in Lindsay, U.S. Pat. No. 5,612,491, and Han et al, U.S. Pat. No. 5,866,805, the disclosures of which are hereby incorporated by reference. Similar procedures have also been described by Cleveland et al, U.S. Pat. No. 5,670,712.

These references teach that a cantilever with a magnetic film or particle is deflected by the effect of forces that arise from the interaction of an applied magnetic field and a magnetic moment fixed to the cantilever. One embodiment of this approach, Lindsay, U.S. Pat. No. 5,515,719, is illustrated in FIG. 1. There, a magnetic particle or film 1 is attached to the cantilever 2 and magnetized so that its magnetic moment, M, 3 points away from the soft axis of the cantilever. A magnetic field gradient, dB/dz 4 is applied parallel to the magnetic moment on the cantilever tip 3, resulting in a force on the tip given by $$F = M \times dB/dz, \qquad (1)$$

where M is the magnetic moment and the magnetic field gradient, dB/dz, is applied along the same direction as the magnetic moment, resulting in a force, F. The generation of forces adequate to displace cantilevers of stiffness on the order of a Newton per meter by several nanometers requires either a very large magnetic moment or a very large field gradient.

Another prior art procedure as taught in Lindsay, U.S. Pat. No. 5,612,491, Han et. al, U.S. Pat. No. 5,866,805, and Cleveland et al, U.S. Pat. No. 5,670,712, is illustrated in FIG. 2. There, a film or particle 5 is magnetized so that its moment, M, 6, points along the soft axis of the cantilever 2. A magnetic field, B, 7, is directed perpendicular to the magnetic moment on the cantilever 6. This results in a torque, N, on the cantilever given by the equation $$N = M \times B \qquad (2)$$

This is roughly equivalent to a force F (8) on the end of the cantilever, given by the equation $$F \approx N/L \qquad (3)$$

where L is the length of the cantilever. This effect has been demonstrated by Han et al, "A Magnetically Driven Oscillating Probe Microscope for Operation in Liquids," *Appl. Phys. Left.* 69, 4111–4113 (1996) who measured a motion of a few nanometers for an applied field of a few Oersteds, using a cantilever of stiffness 0.12 Newtons/meter.

The prior art procedures discussed above require a substantial magnetic moment to be affixed to the tip of the cantilever which limits the range of materials that may be used. In particular, iron alloys which have been used in the past oxidize easily, limiting the operation of the microscope to non-oxidizing environments. Accordingly, there is still a need in this art for a more sensitive method to create magnetic deflection of scanning probe microscope cantilevers and for materials which are more resistant to corrosion than iron-containing alloys.

SUMMARY OF THE INVENTION

These needs are met by the present invention which provides force sensing probes for use in scanning probe microscopes and a method for coating such probes with a film comprising a magnetostrictive material. The probes are magnetized by placing them in a magnetic field which can be oriented in any direction with respect to the probe. The magnetostrictive effect leads to a compression or expansion of the magnetic film, altering its length by the strength of the applied field. This in turn causes the probe, which in a preferred embodiment is in the form of a cantilever, and the applied magnetic film, to deflect or bend. The present invention obtains the advantages that the consequent motion of the probe is much greater than that obtained by direct application of a magnetic force and the effect is not sensitive to the direction of the applied field. Because of the greater consequent motion, a large number of magnetostrictive materials may be utilized, including those which are resistant to oxidation and/or corrosion in hostile environments.

According to one aspect of the present invention, a force sensing probe for sensing the properties of a surface or interface is provided and includes a probe and a film comprising a magnetostrictive material on the probe. The magnetostrictive material preferably comprises material selected from the group consisting of nickel; cobalt; alloys and mixtures of terbium and iron such as Terfenol-D, commercially available from ETREMA Products, Inc., Ames, Iowa; alloys and mixtures of iron, neodymium and boron; alloys and mixtures of nickel and iron; alloys and mixtures of cobalt and iron; alloys and mixtures of nickel and vanadium; alloys and mixtures of nickel and chrome; alloys and mixtures of nickel and manganese; alloys and mixtures of nickel and cobalt; alloys and mixtures of nickel and copper; alloys and mixtures of beryllium and iron; alloys and mixtures of aluminum and iron; alloys and mixtures of germanium and iron; alloys and mixtures of silicon and iron; alloys and mixtures of the oxides of titanium and iron; alloys and mixtures of the oxides of manganese and iron; alloys and mixtures of the oxides of cobalt and iron; alloys and mixtures of the oxides of copper and iron; alloys and mixtures of the oxides of barium and iron; and alloys and mixtures of the oxides of strontium and iron. Many of these materials are resistant to oxidation and/or corrosion.

In a preferred embodiment of the invention, the probe comprises a cantilever having a top surface and a bottom surface, with the bottom surface including a probe tip disposed downwardly therefrom. The film comprising magnetostrictive material may be coated onto either the top or bottom surface of the cantilever structure. In a preferred form, the magnetostrictive material is coated onto the top surface of the cantilever, and the cantilever includes a coating of a different material disposed over the bottom surface and the probe tip. Preferably, the different material also comprises a magnetostrictive material.

The probe is used in a scanning probe microscope such as an atomic force microscope for sensing the properties of a surface or interface. Broadly, such a microscope includes the probe, and a film comprising a magnetostrictive material on the probe, a source for producing a magnetic field to cause deflection of the probe, and a detector for sensing the deflection of the probe.

The invention also includes a method of magnetizing a probe for sensing the properties of a surface or interface comprising the steps of forming a film comprising a magnetostrictive material on a surface of the probe and exposing the probe to a magnetic field in the range of from about 0.1 to about 20,000 Oersteds. In a preferred embodiment of the method, the force sensing cantilever is provided and has a top surface, a bottom surface and a probe tip extending downwardly from the bottom surface. The cantilever is placed in a sputter deposition chamber, and a first film comprising a magnetostrictive material is sputter deposited onto the bottom surface of the cantilever followed by sputter depositing a second film of a different material onto the top surface of the cantilever and over the probe tip. In a preferred embodiment, the different material is also a magnetostrictive material.

Accordingly, it is an object of the present invention to provide a more sensitive method to create magnetic deflection of scanning probe microscope cantilevers and for magnetic materials which are more resistant to oxidation and/or corrosion than iron-containing alloys.

DETAILED DESCRIPTION OF THE PREFERRED EMBODIMENT

Figure 1:
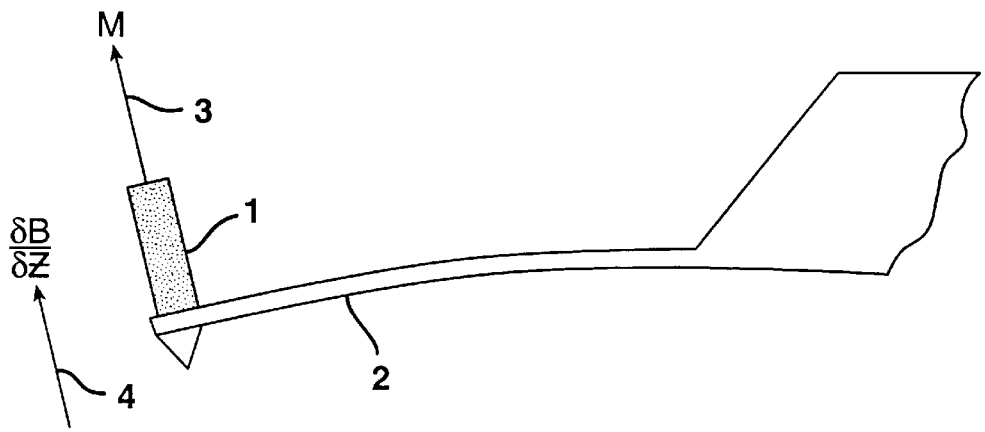
FIG. 1 is a schematic illustration of the deflection of a cantilever with a magnetic particle and a field gradient according to the prior art.
Figure 2:
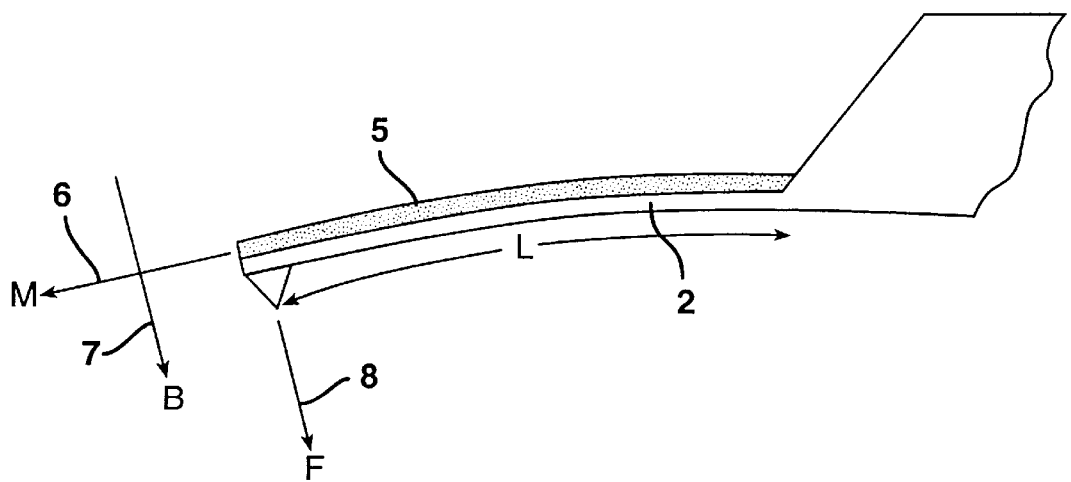
FIG. 2 is a schematic illustration of the deflection of a cantilever through a field-generated torque acting on the magnetic moment of a cantilever according to the prior art.
Figure 3:
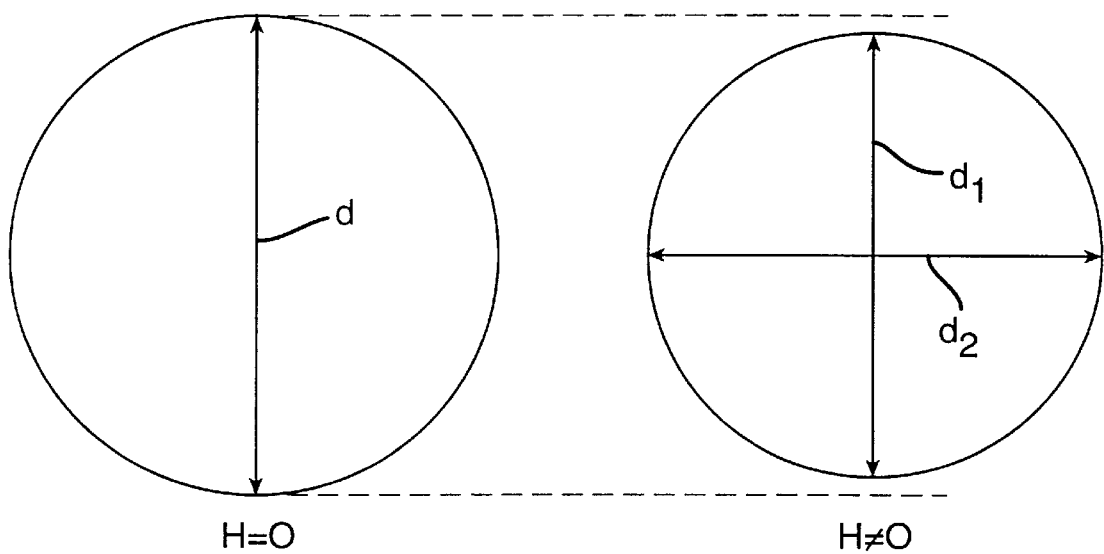
FIG. 3 is a schematic illustration of the dimensional change in a material owing to magnetostriction.

The present invention makes use of the magnetostrictive properties of many magnetic materials such as, for example, those listed in Du Tremolet de Lacheisserie, "Magnetostriction, Theory and Applications of Magnetoelasticity," CRC Press (1993). If a magnetic field H, is applied to a sphere of a magnetic material of diameter d (in the absence of a field, FIG. 3) the material will distort, changing its dimensions from a condition where H=0 to where H≠0. That is, the material will undergo a change in absolute volume. In a general case, as shown in FIG. 3, the absolute volume may shrink; alternatively, it may increase. If the distortion of the material is uniform (i.e., is isotropic), so that $d_1 = d_2$, then a volume magnetostriction, $\omega(H)$, is given by $(d^3 - d_1^3)/d^3$. The corresponding fractional change in linear dimension, $(d - d_1)/d$ is referred to as $\lambda$. Its value is usually given for the saturation magnetic field, $H = H_s$ as $\lambda_s$. In the case of anisotropic deformation, values are given for directions parallel and perpendicular to the applied magnetic field.

The operation of a magnetostrictive transducer is based on the change of $\lambda$ with applied magnetic field, H. This quantity is described by the static magnetostricivity, $d_{33}$. In simple geometries, $$d_{33} = \frac{d\lambda}{dH}. \qquad (4)$$

The strain, $\lambda$, is dimensionless, so $d_{33}$ has units of inverse applied field, or, in the MKS system, meters/Ampere (m/A).

The magnetostrictivity, $d_{33}$ is a complicated function of many parameters, and manufacturers usually quote maximum values, $d_{33}^{max}$. Values for some materials are listed below (data are from Du Tremolet de Lacheisserie):

TABLE 1

Magnetostrictivity for some magnetic materials.

| Material | Source | $d_{33}^{max}$ (m/A) |
|---|---|---|
| Nickel | | $-3.1 \times 10^{-9}$ |
| Terfenol-D | ETREMA Products, Ames, IA | $6 \times 10^{-8}$ |
| Alfer ($Fe_{0.13}Al_{0.87}$) | Johnson Mathey, U.K. | $7.1 \times 10^{-9}$ |

Du Tremolet de Lacheisserie also provides data for a number of other materials and estimates can be made from the plots of $\lambda$ vs. H given there. A value of $5 \times 10^{-9}$ m/A is typical for a number of materials.

The magnetostrictive effect arises from the rotation of domains within a magnetized sample. For magnetic fields below the saturation field of the sample, $H_s$, domains exist in all possible orientations, but with a net overall alignment equal to the net magnetization. Therefore, provided that magnetization proceeds by rotation of domains (as opposed to free flow of domain walls), the magnetostriction can be an isotropic effect independent of the orientation between the applied field and any net magnetization of the sample.

Figure 4:
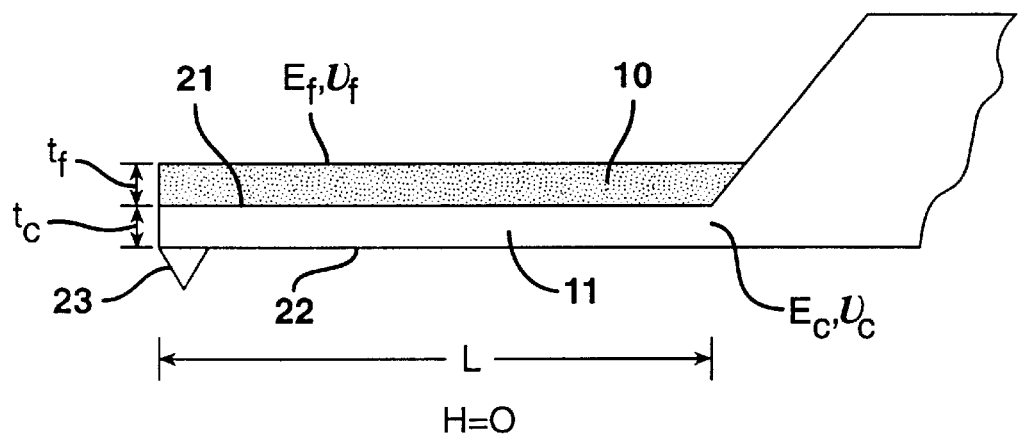
FIG. 4 is a schematic illustration of a film of magnetostrictive material on a non-magnetostrictive cantilever at zero applied magnetic field.

In the present invention, referring now to FIG. 4, a film of magnetostrictive material 10 is deposited onto a surface 21 of the cantilever 11 such as, for example, by sputter deposition techniques. Cantilever 11 also includes a bottom surface 22 and a probe tip 23 extending downwardly therefrom. Cantilever 11 has a thickness $t_c$ a length L, a Young's modulus $E_c$ and a Poisson's ratio $v_c$. The film 10 has a thickness $t_f$, a Young's modulus, $E_f$ and a Poisson's ratio $v_f$. In the absence of an applied magnetic field (H=0), the film and cantilever are in the position shown.

Figure 5:
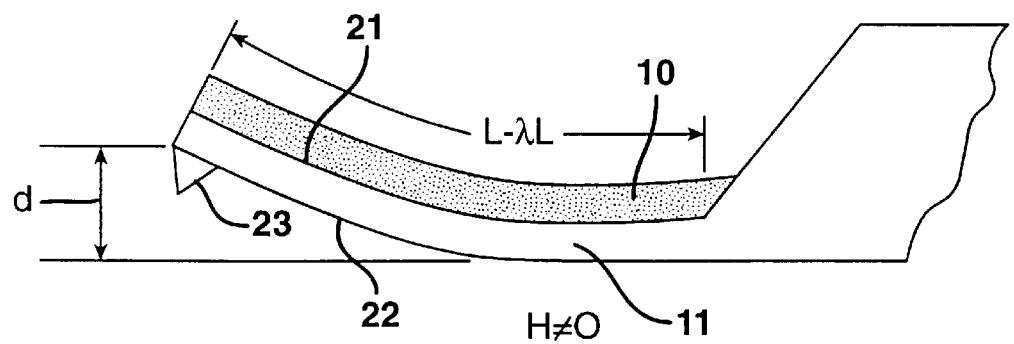
FIG. 5 is a schematic illustration of a film of magnetostrictive material on a non-magnetostrictive cantilever at a non-zero applied magnetic field.

As shown in FIG. 5, upon application of a magnetic field (H≠0), the film 10 changes length to L–λL while the cantilever 11 remains the same length, resulting in a displacement, d, of the end of the cantilever. A material with positive magnetostriction would change length to L+λL, resulting in a downward movement. The displacement, d, is defined as $$d = \frac{3t_f L^2 \varepsilon}{t_c^2} \lambda \qquad (5)$$

where $$\varepsilon = \frac{E_f(1 - v_c)}{E_c(1 + v_f)} \qquad (6)$$

and for a small applied magnetic field $$\lambda = d_{33} H. \qquad (7)$$

For a wide range of materials, $\varepsilon \approx 1$ and taking L=100 μm, $t_c$=0.6 μm, $t_f$=0.1 μm, $d_{33}$=5×10⁻⁹ m/A and H=1 kA/m (about 12 Oe) gives d=50 nanometers. Note that this value for d is larger than the displacement estimated for the direct magnetic effect by Han et al, *Appl. Phys. Lett.* 69:4111–4113 (1996).

Figure 12:
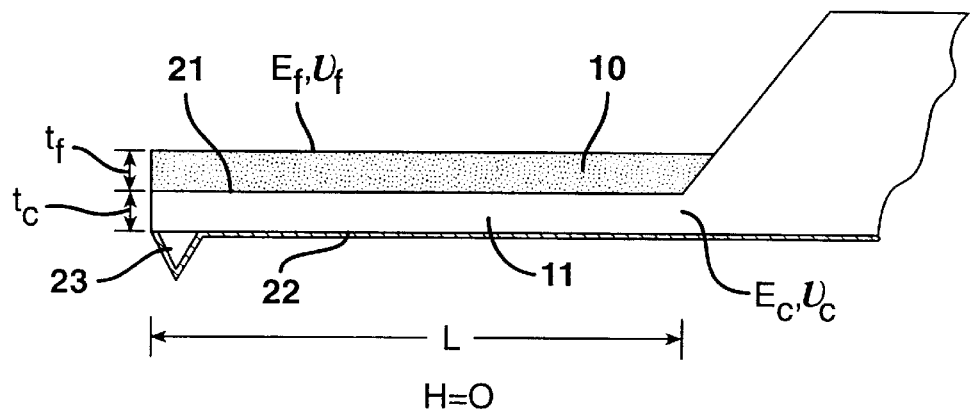
FIG. 12 is a schematic illustration of another embodiment of the invention which includes a cantilever having a layer of a magnetostrictive material applied to one surface of the cantilever and a layer of a different material applied to the opposite surface of the cantilever.
Figure 13:
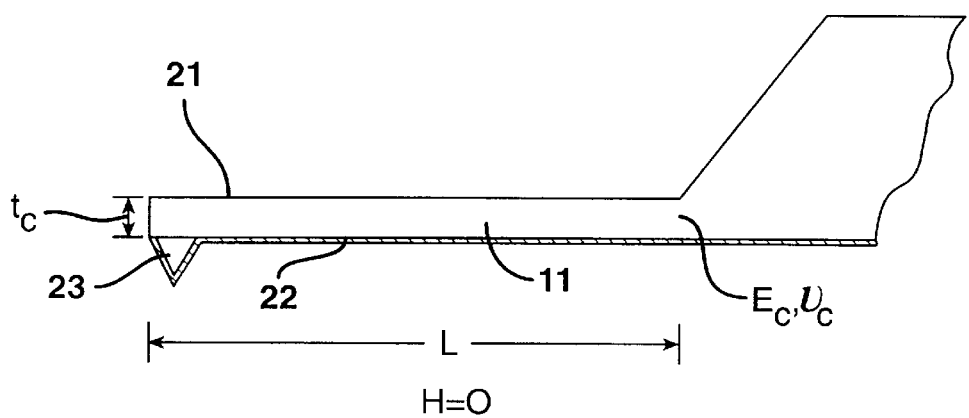
FIG. 13 is a schematic illustration of another embodiment of the invention which includes a cantilever having a layer of a magnetostrictive material applied to the lower surface of the cantilever.

In the embodiment illustrated in FIGS. 4 and 5, magnetostrictive material 10 was deposited onto top surface 21 of the cantilever. An example of a magnetostrictive material which could be so deposited is nickel. It is also within the scope of the invention to deposit the film of magnetostrictive material onto the bottom surface 22 of cantilever 11. This embodiment is illustrated in FIG. 13 in which a film of a magnetostrictive material 12 is deposited onto the lower surface 22 of cantilever 11. For some cantilevers and some magnetostrictive materials, deposition of a film on the top or bottom surface only of cantilever 11 may cause the cantilever to have a tendency to curl. To counteract this tendency, a film of a second material, which itself may be a magnetostrictive material, may be deposited onto the opposite surface of the cantilever, which in the embodiment shown in FIGS. 4 and 5 would be bottom surface 22 of the cantilever. This embodiment is illustrated in FIG. 12 in which a film of a second material 12 is applied to the bottom surface 22 of cantilever 11. Further, the magnetostrictivity values of the two materials may be chosen to complement one another. For example, one of the materials may be chosen to have a positive magnetostrictivity while the other has a negative magnetostrictivity.

Figure 6:
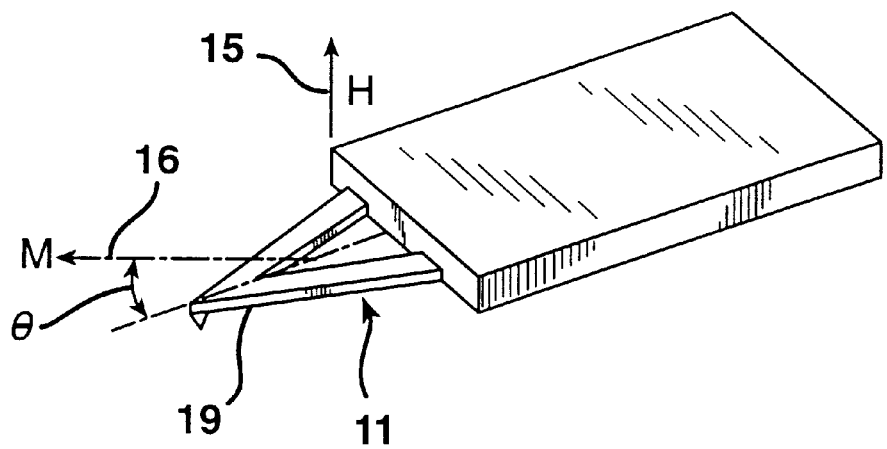
FIG. 6 is a schematic illustration defining an axial angle, $\theta$, of orientation between a magnetization and the plane of the cantilever.
Figure 7:
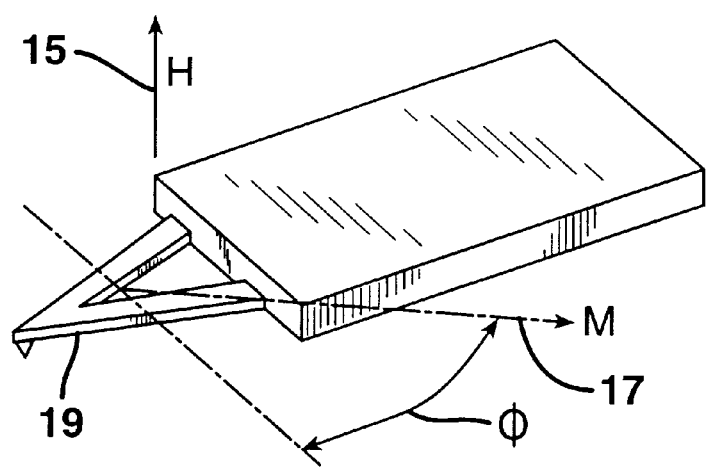
FIG. 7 is a schematic illustration defining an azimuthal angle, $\phi$, of orientation between a magnetization and the plane of the cantilever.
Figure 8:
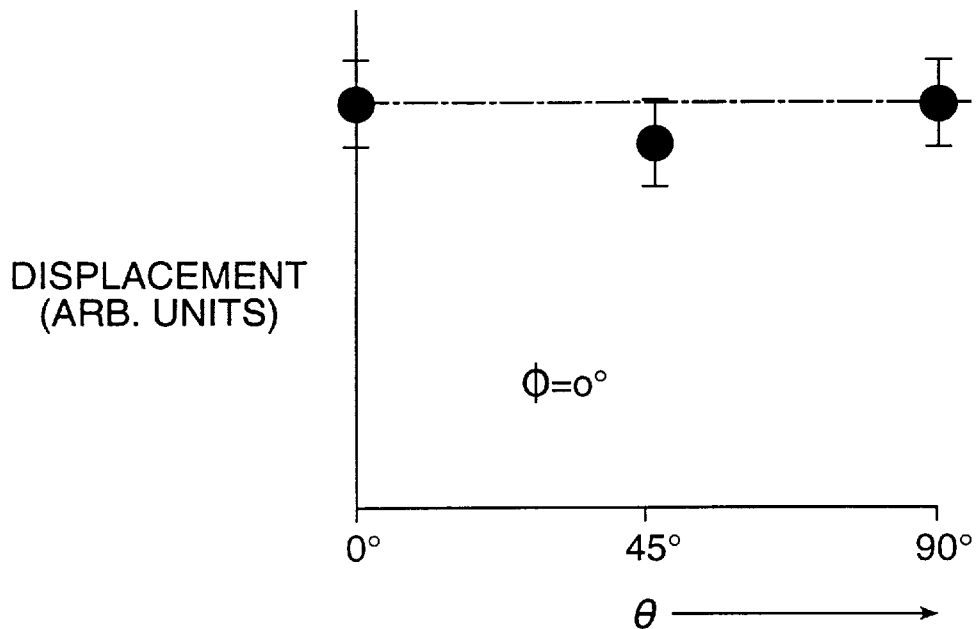
FIG. 8 is a graph of the measured deflection of a cantilever (arbitrary units) coated with Fe—Nd—B alloy as a function of axial angle $\theta$ between the magnetization and applied field for a constant azimuthal angle ($\phi=0$)
Figure 9:
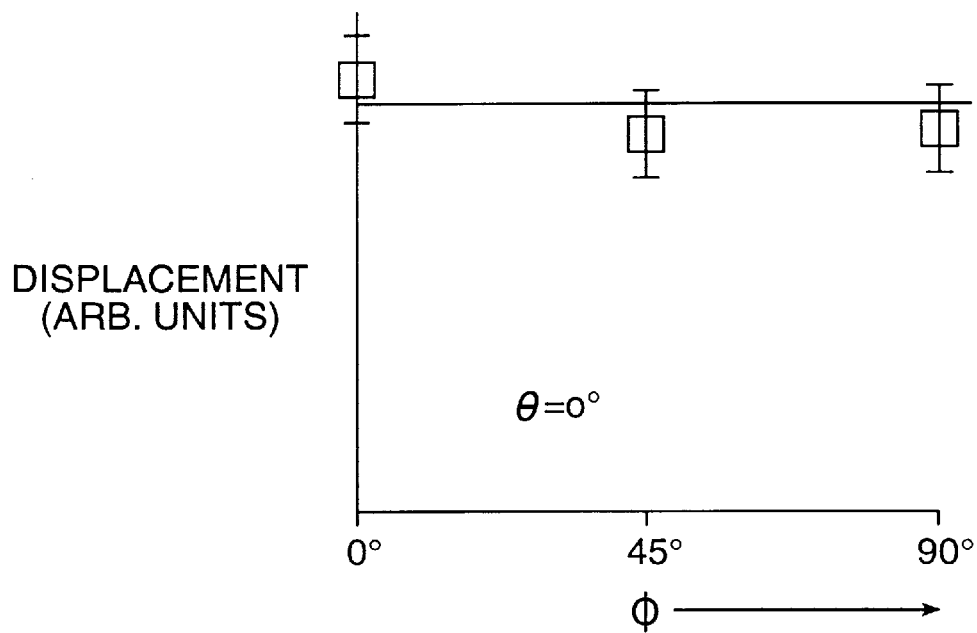
FIG. 9 is a graph of the measured deflection of a cantilever (arbitrary units) coated with Fe—Nd—B alloy as a function of azimuthal angle $\phi$ between the magnetization and applied field for a constant axial angle ($\theta=0$)

A key signature of the magnetostrictive effect is its lack of a strong dependence on the angle between the applied field and the magnetization direction of the film. FIG. 6 illustrates a possible orientation of the magnetization M, 16 with respect to the long axis 19 of the cantilever 11, denoted by the angle θ. The applied magnetic field, H, 15 is shown normal to the plane of the cantilever. FIG. 7 shows another orientation, where the angle φ between the magnetization M, 17 and the long axis 19 of cantilever 11 is defined with respect to a line perpendicular to the long axis of the cantilever and lying in the plane of the cantilever. The displacement of cantilevers coated with a Neodymium-Iron-Boron magnetic alloy described in U.S. Pat. No. 5,642,491 were measured as a function of orientation for a fixed magnetic field. The results are shown in FIG. 8 for φ=0° and for various values of θ between 0 and 90°. Results for θ=0° and various values of φ between 0 and 90° are shown in FIG. 9. It is believed that the films magnetized with the applied field lying 45° out of the plane of the cantilever were in fact magnetized in plane, because of the shape anisotropy of the films which makes it difficult to magnetize them out of the plane. However, the film magnetized in-plane but perpendicular to its length (θ=0°, φ=0°) would produce no displacement of the end of the tip by the direct-force mechanism because the torque would act to twist the cantilever about its long axis. It is clear that the displacement of these films is dominated by a magnetostrictive effect as opposed to a direct magnetic force effect.

Figure 10:
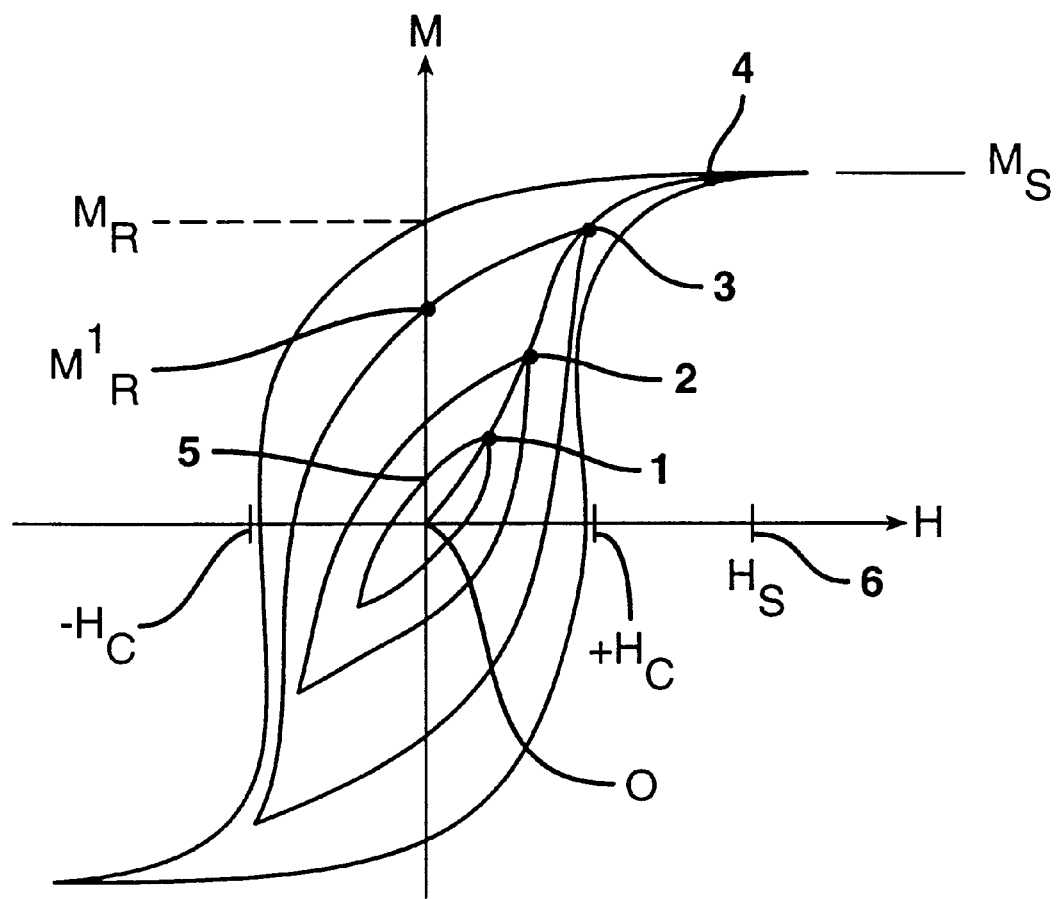
FIG. 10 is a chart of the magnetization M, vs. applied magnetic field H, for a series of sweeps of H after stepping to successively higher values (1,2,3,4) of H after each sweep from the first sweep.

The foregoing discussion assumed a value for the magnetostricivity, $d_{33}$, close to the maximum. However, this variable is strongly dependent on the method of preparation of the film and on its magnetization. For films that are sputtered, domain wall movement probably plays less role in magnetization than domain orientation, and, in these circumstances, the volume magnetostriction scales roughly with the square of the magnetization of the material. A schematic plot of the magnetization, M, of a material as a function of applied magnetic field, H, is shown in FIG. 10. Starting with an unmagnetized sample 0 at M=0, H=0, H is increased to cause an increase in M up to point 1. As H is subsequently reduced, M falls more slowly, so that when H is returned to 0, some residual magnetization 5 remains which is termed $M_R$. The curve continues down as the field is reversed, the magnetization only reversing at a substantial negative value of H. As H is brought back up to its former maximum value, $H_M$, the magnetization returns to its former maximum value. If the applied field is now stepped to a new high value 2, the loop is repeated, enclosing a bigger area of the M vs. H plot. A loop for a yet bigger value of $H_M$ is shown starting at point 3. Finally, if the field is taken up to the value required to saturate the material (point 4), the saturation magnetization, $M_s$, is reached and further increase of the field has little effect on M. This upper value of field is $H_S$, 6. As H is reduced down to zero, the magnetization falls to $M_R$, the remnant magnetization, that characterizes the strongest permanent magnet that can be made with the material (corresponding to a remnant field at the magnet pole, $B_R$). When the applied field is taken to a negative value, $H_c$, the magnetization falls to zero. $H_c$ is the coercive field.

It can be seen that a non-magnetized, or weakly magnetized material will have a small magnetostriction because its magnetic moment is small. However, it is also clear that a fully saturated material will have a small magnetostrictivity, because the dependence of the magnetization on applied field is small, since $M_R \approx M_S$.

Once magnetized, the material will remain at a characteristic remnant field, $M_R$ that depends upon $H_M$. The application of a small field will cause the magnetization to vary linearly with a gradient that decreases as $H_M$ approaches the saturation field. This behavior may be characterized as follows:

$$M = A\left(1 - \frac{H_M}{H_S}\right)H + \frac{H_M}{H_S}M_R. \tag{8}$$

If $\lambda(H) \, M(H)^2$, then, in the limit that H→0, it follows from equation 8 that $$\frac{d\lambda}{dH} \propto \frac{H_M}{H_S}\left(1 - \frac{H_M}{H_S}\right)M_R. \tag{10}$$

Equation 10 shows that it is desirable to (a) use a material with a high residual magnetization and (b) magnetize it by bringing it to a field which is on the order of $H_S/2$. For many materials, $H_s \approx 0.5$–1T, since it is determined by the density of atomic spins. Therefore, the films need to be treated by bringing them from their virgin (unmagnetized state) into a field of 0.25 to 0.5T (2.5 to 5 kOe).

Cantilevers have also been coated with about a 100 nanometer thick film of cobalt, obtaining similar results, which implies that $d_{33}$ for a cobalt film is on the order of $10^{-9}$ m/A. Similar results have been obtained with nickel. Both cobalt and nickel are much less susceptible to oxidation and corrosion than iron-containing magnetic alloys.

The cantilevers, commercial silicon-nitride devices available as Ultralevers from Park Scientific of Sunnyvale, Calif., are coated on one surface, preferably the top surface, with a film of about a 100 nanometer thickness of Co, Ni or Fe—Nd—B alloy by means of argon-ion sputtering of a target. The opposite (bottom) surface of the cantilevers is coated with a 5 to 10 nanometer thickness of a different material such as, for example, chrome to compensate for any bending caused by the application of the magnetostrictive film as described in Han et al. U.S. Pat. No. 5,866,805. The cantilevers are then magnetized in a field of about 3 kOe. They are mounted, for example, in an atomic force microscope close to the pole piece of a solenoid, the field of which may be oriented at any angle to the cantilever.

Figure 11:
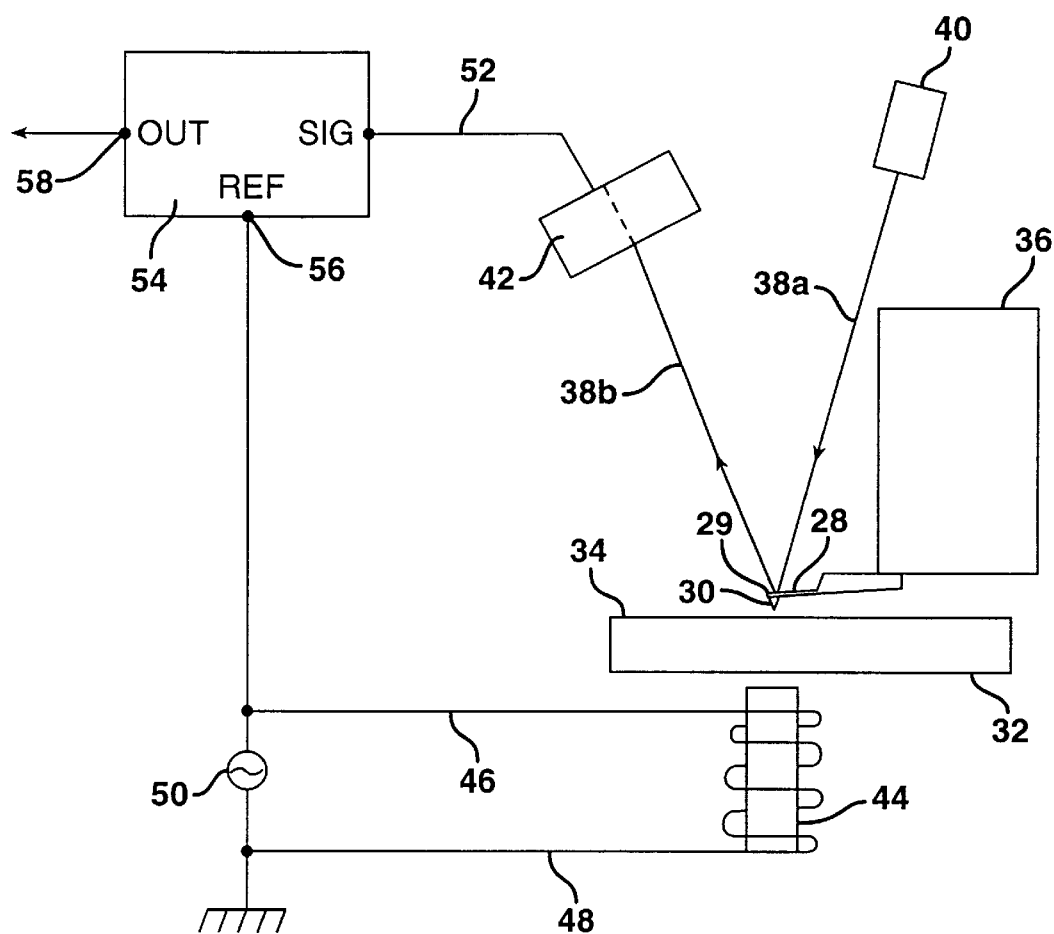
FIG. 11 is a schematic illustration of a scanning probe microscope utilizing the force sensing cantilever of the present invention.

As shown schematically in FIG. 11, such a microscope includes a cantilever 28, having a film 29 comprising a magnetostrictive material on the top surface thereof. Cantilever 28 includes a probe tip 30 extending from the bottom surface thereof toward sample 32. The probe tip 30 is scanned over the surface 34 of sample 32 by a piezoelectric scanner 36. Deflections of cantilever 28 are detected by directing a focused beam of radiation 38a from, for example, a laser 40 off of the reflective surface of film 29 to form a reflected beam 38b. The angular position of beam 38b is sensed by a position sensitive detector 42.

A solenoid 44 in close proximity to cantilever 28 is driven by an AC signal on lines 46 and 48 from an oscillator 50. The resulting alternating magnetic field causes cantilever 28 to oscillate. This oscillating motion appears as an AC signal component in the signal on line 52 which is detected by position sensitive detector 42. This signal on line 52 is fed to a synchronous detector 54. A reference input 56 for synchronous detector 54 is provided by the same oscillator 50 that drives solenoid 44. Output 58 of synchronous detector 54 is used to control the height of cantilever 28 above the sample surface 34 and an AFM image of the surface 34 is formed from the corresponding height adjustments in a conventional manner.

Those skilled in the art will recognize that many suitable magnetostrictive alloys are suitable for this task, including nickel-iron, cobalt-iron, nickel-vanadium, nickel-chrome, nickel-manganese, nickel-cobalt, nickel-copper, beryllium-iron, aluminum-iron, germanium-iron, silicon-iron and the oxides of titanium-iron, manganese-iron, cobalt-iron, copper-iron, barium-iron and strontium-iron, and the commercial magnetostrictive alloy, Terfenol-D (available from ETREMA Products, Inc, Ames, Iowa).

While certain representative embodiments and details have been shown for purposes of illustrating the invention, it will be apparent to those skilled in the art that various changes in the methods and apparatus disclosed herein may be made without departing from the scope of the invention, which is defined in the appended claims.

What is claimed is:

1. A force sensing probe for sensing the properties of a surface or interface comprising a probe and a film comprising a magnetostrictive material on said probe.

2. A force sensing probe as claimed in claim 1 in which said magnetostrictive material comprises material selected from the group consisting of nickel; cobalt; alloys and mixtures of terbium and iron; alloys and mixtures of iron, neodymium and boron; alloys and mixtures of nickel and iron; alloys and mixtures of cobalt and iron; alloys and mixtures of nickel and vanadium; alloys and mixtures of nickel and chrome; alloys and mixtures of nickel and manganese; alloys and mixtures of nickel and cobalt; alloys and mixtures of nickel and copper; alloys and mixtures of beryllium and iron; alloys and mixtures of aluminum and iron; alloys and mixtures of germanium and iron; alloys and mixtures of silicon and iron; alloys and mixtures of the oxides of titanium and iron; alloys and mixtures of the oxides of manganese and iron; alloys and mixtures of the oxides of cobalt and iron; alloys and mixtures of the oxides of copper and iron; alloys and mixtures of the oxides of barium and iron; and alloys and mixtures of the oxides of strontium and iron.

3. A force sensing probe as claimed in claim 1 in which said probe comprises a cantilever having a top surface and a bottom surface, said bottom surface including a probe tip disposed downwardly therefrom.

4. A force sensing probe as claimed in claim 3 in which said magnetostrictive material is coated onto said top surface of said cantilever.

5. A force sensing probe as claimed in claim 4 in which cantilever includes a coating comprising a different material disposed over said bottom surface and said probe tip.

6. A force sensing probe as claimed in claim 5 in which said different material comprises a magnetostrictive material.

7. A force sensing cantilever for an atomic force microscope comprising a cantilever structure having a top surface and a bottom surface, said bottom surface including a probe tip disposed downwardly therefrom, a film comprising a magnetostrictive material coated onto one of said surfaces and a film comprising a different material coated onto the other of said surfaces.

8. A force sensing cantilever as claimed in claim 7 in which said different material comprises a magnetostrictive material.

9. A force sensing cantilever as claimed in claim 7 in which said magnetostrictive material is coated onto said top surface of said cantilever.

10. A force sensing cantilever as claimed in claim 9 in which said magnetostrictive material is coated onto said bottom surface of said cantilever and over said probe tip.

11. A scanning probe microscope for sensing the properties of a surface or interface comprising a probe, a film comprising a magnetostrictive material on said probe, a source for producing a magnetic field to cause deflection of said probe, and a detector for sensing the deflection of said probe.

12. A scanning probe microscope as claimed in claim 11 in which said magnetostrictive material comprises material selected from the group consisting of nickel; cobalt; alloys and mixtures of terbium and iron; alloys and mixtures of iron, neodymium and boron; alloys and mixtures of nickel and iron; alloys and mixtures of cobalt and iron; alloys and mixtures of nickel and vanadium; alloys and mixtures of nickel and chrome; alloys and mixtures of nickel and manganese; alloys and mixtures of nickel and cobalt; alloys and mixtures of nickel and copper; alloys and mixtures of beryllium and iron; alloys and mixtures of aluminum and iron; alloys and mixtures of germanium and iron; alloys and mixtures of silicon and iron; alloys and mixtures of the oxides of titanium and iron; alloys and mixtures of the oxides of manganese and iron; alloys and mixtures of the oxides of cobalt and iron; alloys and mixtures of the oxides of copper and iron; alloys and mixtures of the oxides of barium and iron; and alloys and mixtures of the oxides of strontium and iron.

13. A scanning probe microscope as claimed in claim 11 in which said probe comprises a cantilever having a top surface and a bottom surface, said bottom surface including a probe tip disposed downwardly therefrom.

14. A scanning probe microscope as claimed in claim 13 in which said magnetostrictive material is coated onto said top surface of said cantilever.

15. A scanning probe microscope as claimed in claim 14 in which cantilever includes a coating comprising a different material disposed over said bottom surface and said probe tip.

16. A scanning probe microscope as claimed in claim 15 in which said different material comprises a magnetostrictive material.

17. A method of magnetizing a probe for sensing the properties of a surface or interface comprising the steps of forming a film comprising a magnetostrictive material on a surface of said probe and exposing said probe to a magnetic field in the range of from about 0.1 to about 20,000 Oersteds.

18. A method as claimed in claim 17 in which said magnetostrictive material comprises material selected from the group consisting of nickel; cobalt; alloys and mixtures of terbium and iron; alloys and mixtures of iron, neodymium and boron; alloys and mixtures of nickel and iron; alloys and mixtures of cobalt and iron; alloys and mixtures of nickel and vanadium; alloys and mixtures of nickel and chrome; alloys and mixtures of nickel and manganese; alloys and mixtures of nickel and cobalt; alloys and mixtures of nickel and copper; alloys and mixtures of beryllium and iron; alloys and mixtures of aluminum and iron; alloys and mixtures of germanium and iron; alloys and mixtures of silicon and iron; alloys and mixtures of the oxides of titanium and iron; alloys and mixtures of the oxides of manganese and iron; alloys and mixtures of the oxides of cobalt and iron; alloys and mixtures of the oxides of copper and iron; alloys and mixtures of the oxides of barium and iron; and alloys and mixtures of the oxides of strontium and iron.

19. A method as claimed in claim 18 in which said probe comprises a cantilever having a top surface and a bottom surface, said bottom surface including a probe tip disposed downwardly therefrom.

20. A method as claimed in claim 19 in which said magnetostrictive material is coated onto said top surface of said cantilever.

21. A method as claimed in claim 20 in which cantilever includes a coating comprising a different material disposed over said bottom surface and said probe tip.

22. A method as claimed in claim 21 in which said different material comprises a magnetostrictive material.

23. A method of magnetizing a force sensing cantilever for a scanning probe microscope comprising the steps of:

forming a cantilever having a top surface, a bottom surface and a probe tip extending downwardly from said bottom surface;

sputter depositing a first film comprising a magnetostrictive material onto said bottom surface of said cantilever; and sputter depositing a second film comprising a different material onto said top surface of said cantilever.

24. A method as claimed in claim 23 in which said magnetostrictive material is coated onto said top surface of said cantilever.

25. A method as claimed in claim 24 in which said magnetostrictive material is coated onto said bottom surface of said cantilever and over said probe tip.

26. A method as claimed in claim 23 in which said magnetostrictive material comprises material selected from the group consisting of nickel; cobalt; alloys and mixtures of terbium and iron; alloys and mixtures of iron, neodymium and boron; alloys and mixtures of nickel and iron; alloys and mixtures of cobalt and iron; alloys and mixtures of nickel and vanadium; alloys and mixtures of nickel and chrome; alloys and mixtures of nickel and manganese; alloys and mixtures of nickel and cobalt; alloys and mixtures of nickel and copper; alloys and mixtures of beryllium and iron; alloys and mixtures of aluminum and iron; alloys and mixtures of germanium and iron; alloys and mixtures of silicon and iron; alloys and mixtures of the oxides of titanium and iron; alloys and mixtures of the oxides of manganese and iron; alloys and mixtures of the oxides of cobalt and iron; alloys and mixtures of the oxides of copper and iron; alloys and mixtures of the oxides of barium and iron; and alloys and mixtures of the oxides of strontium and iron.

* * * * *